United States Patent
Zhang et al.

(10) Patent No.: US 11,893,770 B2
(45) Date of Patent: Feb. 6, 2024

(54) METHOD FOR CONVERTING A PICTURE INTO A VIDEO, DEVICE, AND STORAGE MEDIUM

(71) Applicant: BEIJING ZITIAO NETWORK TECHNOLOGY CO., LTD., Beijing (CN)

(72) Inventors: Shupeng Zhang, Beijing (CN); Xiaorui Gan, Beijing (CN); Jie Wen, Beijing (CN); Yitong Wang, Beijing (CN); Jingxiang Pan, Beijing (CN)

(73) Assignee: BEIJING ZITIAO NETWORK TECHNOLOGY CO., LTD.

( * ) Notice: Subject to any disclaimer, the term of this patent is extended or adjusted under 35 U.S.C. 154(b) by 0 days.

(21) Appl. No.: 18/148,372

(22) Filed: Dec. 29, 2022

(65) Prior Publication Data
US 2023/0140558 A1 May 4, 2023

Related U.S. Application Data

(63) Continuation of application No. PCT/CN2021/119409, filed on Sep. 18, 2021.

(30) Foreign Application Priority Data

Sep. 29, 2020 (CN) .......................... 202011052771.7

(51) Int. Cl.
*G06T 5/50* (2006.01)
*G06T 7/194* (2017.01)
(Continued)

(52) U.S. Cl.
CPC ................ *G06V 10/56* (2022.01); *G06T 5/50* (2013.01); *G06T 7/194* (2017.01); *G06T 7/90* (2017.01);
(Continued)

(58) Field of Classification Search
CPC .......... G06V 10/28; G06V 10/56; G06T 5/50; G06T 7/194; G06T 7/90;
(Continued)

(56) References Cited

U.S. PATENT DOCUMENTS 6,249,596 B1  6/2001 Buytaert et al.
RE39,712 E *  7/2007 Vogel ................... H04N 25/447
                                        348/222.1
(Continued)

FOREIGN PATENT DOCUMENTS

CN    101299277 A    11/2008
CN    101325664 A    12/2008
(Continued)

OTHER PUBLICATIONS

Kwok et al. ("Adaptive scale adjustment design of unsharp masking filters for image contrast enhancement," IEEE International Conference on Machine Learning and Cybernetics, vol. 2; Jul. 14, 2013) (Year: 2013).*

(Continued)

*Primary Examiner* — Yubin Hung

(57) ABSTRACT

Provided are a method for converting a picture into a video, a device, and a storage medium. The method for converting a picture into a video includes the following: performing color fading processing on an original picture to obtain a black-and-white image; determining a foreground area and a background area of the black-and-white image; performing iterative color restoration on pixels in the black-and-white image based on a processing order of the foreground area and the background area, and storing the image obtained by each restoration as a picture frame to obtain multiple frames of images; and splicing the multiple frames of images to obtain a target video.

20 Claims, 2 Drawing Sheets

(51) Int. Cl.
  *G06T 7/90* (2017.01)
  *G06V 10/28* (2022.01)
  *G06V 10/56* (2022.01)
  *H04N 1/40* (2006.01)

(52) U.S. Cl.
  CPC ......... *G06V 10/28* (2022.01); *H04N 1/40012* (2013.01); *G06T 2207/10024* (2013.01); *G06T 2207/20024* (2013.01); *G06T 2207/20221* (2013.01)

(58) Field of Classification Search
  CPC . G06T 2207/10024; G06T 2207/20024; G06T 2207/2021; H04N 1/40012
  See application file for complete search history.

(56) References Cited

U.S. PATENT DOCUMENTS

| | | | | |
|---|---|---|---|---|
| 7,728,844 | B2* | 6/2010 | Trimeche | H04N 23/84 345/611 |
| 2004/0227977 | A1 | 11/2004 | Yoshida | |
| 2010/0208081 | A1* | 8/2010 | Tokutake | H04N 7/0132 348/189 |
| 2013/0141439 | A1* | 6/2013 | Kryzhanovsky | G06T 13/80 345/473 |
| 2014/0294287 | A1* | 10/2014 | Guo | G06T 7/181 382/154 |

FOREIGN PATENT DOCUMENTS

| | | | | |
|---|---|---|---|---|
| CN | 101729760 | A | | 6/2010 |
| CN | 102542526 | A | | 7/2012 |
| CN | 102547063 | A | | 7/2012 |
| CN | 104202540 | A | | 12/2014 |
| CN | 107968946 | A | * | 4/2018 ........... H04N 19/182 |
| CN | 108322837 | A | | 7/2018 |
| CN | 109729286 | A | | 5/2019 |
| CN | 109741408 | A | | 5/2019 |
| JP | 2002232674 | A | | 8/2002 |

OTHER PUBLICATIONS

Tehrani et al. ("Iterative colour correction of multicamera systems using corresponding feature points," Journal of Visual Communication and Image Representation, vol. 21, Issues 5-6, Jul.-Aug. 2010) (Year: 2010).*
Roe et al. ("Automatic system for restoring old color postcards," IEEE International Conference on Systems, Man, and Cybernetics; Date of Conference: Oct. 14-17, 2012) (Year: 2012).*
Jeong et al. ("Exemplar-based frame rate up-conversion with congruent segmentation," 19th IEEE International Conference on Image Processing; Date of Conference: Sep. 30-Oct. 3, 2012) (Year: 2012).*
Bao et al. ("Frame rate up-conversion based on motion-region segmentation," Visual Communications and Image Processing; Date of Conference: Nov. 27-30, 2016) (Year: 2016).*
Cho et al. ("Temporal Frame Interpolation Based on Multiframe Feature Trajectory," IEEE Transactions on Circuits and Systems for Video Technology; vol. 23, Issue: 12, Dec. 2013. Date of Publication: Jun. 20, 2013) (Year: 2013).*
First Office Action dated Aug. 3, 2022 in Chinese Application No. 202011052771.7, with English translation (10 pages).
Yang Rui, Research on Super-resolution Reconstruction of Dynamic Sequence Remote Sensing Images, Xi'an Institute of Optics & Precision Mechanics, Chinese Academy of Sciences, Jun. 2019 (175 pages).
International Search Report dated Dec. 16, 2021 in International Application No. PCT/CN2021/119409, with English translation (4 pages).
Doug H: "Animate a Picture to Go From Grayscale to Full Color", Jan. 13, 2013 (Jan. 13, 2013), XP093094387, Retrieved from the Internet: URL:https://www.youtube.com/watch?v=YeBA09 eCizU [retrieved on Oct. 24, 2023].
Anonymous: "GIMP—Selective Colorization" Dec. 31, 2002 (Dec. 31, 2002), XP093094404, Retrieved from the Internet: URL:https://www.gimp.org/tutorials/Selecti ve_Color/ [retrieved on Oct. 24, 2023].
European Search Report dated Nov. 2, 2023 for European Application No. 21874292.2.

* cited by examiner

METHOD FOR CONVERTING A PICTURE INTO A VIDEO, DEVICE, AND STORAGE MEDIUM

CROSS-REFERENCE TO RELATED APPLICATIONS

This is a continuation of International Patent Application No. PCT/CN2021/119409, filed on Sep. 18, 2021, which is based on and claims priority to Chinese Patent Application No. 202011052771.7 filed with the China National Intellectual Property Administration (CNIPA) on Sep. 29, 2020, the disclosures of which are incorporated herein by reference in their entireties.

TECHNICAL FIELD

The present disclosure relates to the technical field of picture processing, for example, a method for converting a picture into a video, a device, and a storage medium.

BACKGROUND

With the increasing popularity of smart devices, the camera function has become an indispensable function in mobile phones. However, photos taken by mobile phones are only static pictures which are not interesting.

SUMMARY

The present disclosure provides a method for converting a picture into a video, a device, and a storage medium, which can be used to convert a static picture into a dynamic video, implementing the automatic production of a foreground area color retention album without manual production of a video, and improving the convenience of production of the album.

The present disclosure provides a method for converting a picture into a video. The method includes performing color fading processing on an original picture to obtain a black-and-white image; determining a foreground area and a background area of the black-and-white image; performing iterative color restoration on pixels in the black-and-white image based on a processing order of the foreground area and the background area, and storing an image obtained by each restoration as a picture frame to obtain multiple frames of images; and splicing the multiple frames of images to obtain a target video.

The present disclosure also provides an apparatus for converting a picture into a video. The apparatus includes a black-and-white image acquisition module, an image area determination module, a color restoration module, and a target video acquisition module.

The black-and-white image acquisition module is configured to perform color fading processing on an original picture to obtain a black-and-white image.

The image area determination module is configured to determine a foreground area and a background area of the black-and-white image.

The color restoration module is configured to perform iterative color restoration on pixels in the black-and-white image based on a processing order of the foreground area and the background area and store an image obtained by each restoration as a picture frame to obtain multiple frames of images.

The target video acquisition module is configured to splice the multiple frames of images to obtain a target video.

The present disclosure also provides an electronic device. The electronic device includes one or more processing apparatuses and a storage apparatus.

The storage apparatus is configured to store one or more instructions.

When the one or more instructions are executed by the one or more processing apparatuses, the one or more processing apparatuses implement the preceding method for converting a picture into a video.

The present disclosure also provides a non-transitory computer-readable storage medium storing computer programs. When executed by a processing apparatus, the computer programs implement the preceding method for converting a picture into a video.

DETAILED DESCRIPTION

Embodiments of the present disclosure are described below with reference to the drawings. The drawings illustrate some embodiments of the present disclosure, but it is to be understood that the present disclosure may be implemented in various manners and should not be limited to the embodiments set forth herein. These embodiments are provided for a more thorough and complete understanding of the present disclosure.

The various steps recited in method embodiments of the present disclosure may be performed in a different order and/or in parallel. In addition, the method embodiments may include additional steps and/or omit execution of illustrated steps. The scope of the present disclosure is not limited in this respect.

As used herein, the term "comprise" and variations thereof are intended to be inclusive, that is, "including, but not limited to". The term "based on" is "at least partially based on". The term "an embodiment" refers to "at least one embodiment". The term "another embodiment" refers to "at least one another embodiment". The term "some embodiments" refers to "at least some embodiments". Related definitions of other terms are given in the description hereinafter.

Concepts such as "first" and "second" in the present disclosure are merely intended to distinguish one from another apparatus, module, or unit and are not intended to limit the order or interrelationship of the functions executed by the apparatus, module, or unit.

"One" and "a plurality" mentioned in the present disclosure are illustrative, are not intended to limit the present disclosure, and should be understood as "one or more" unless expressed in the context.

The names of messages or information exchanged between multiple apparatuses in embodiments of the present disclosure are only for illustrative purposes and are not intended to limit the scope of such messages or information.

Figure 1:
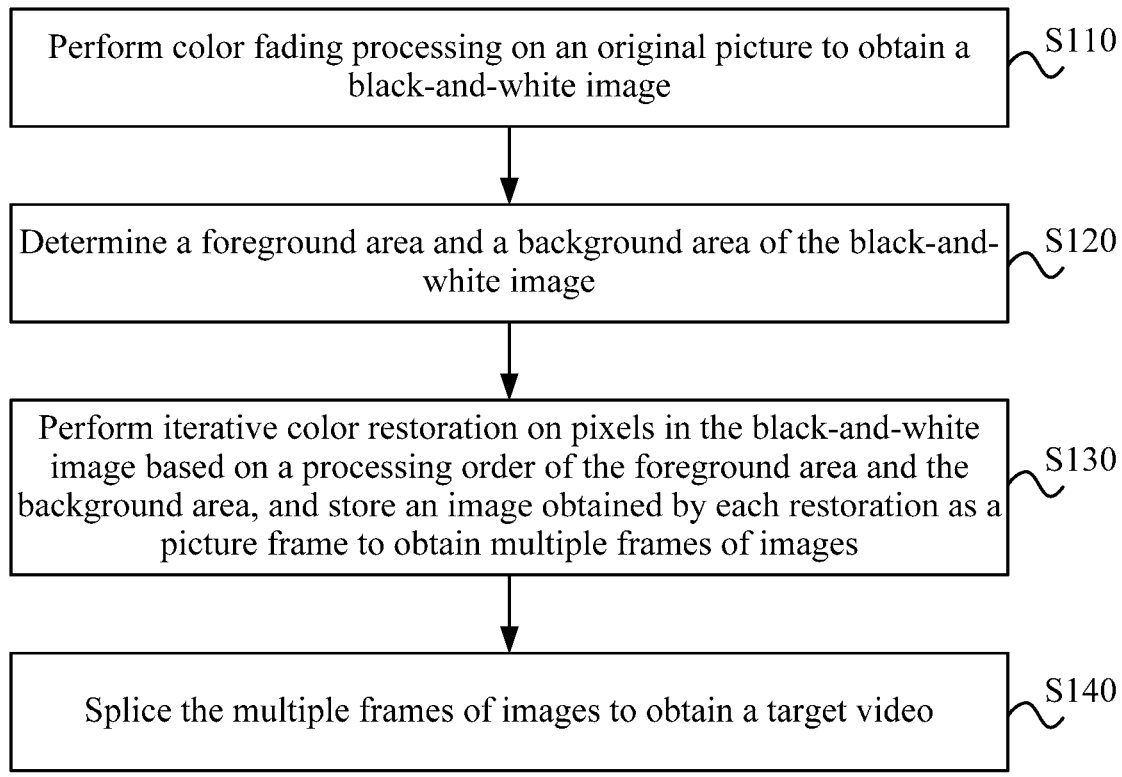
FIG. 1 is a flowchart of a method for converting a picture into a video according to an embodiment of the present disclosure.

FIG. 1 is a flowchart of a method for converting a picture into a video according to an embodiment of the present disclosure. This embodiment is applicable to the case of converting a static picture into a dynamic video. The method may be executed by an apparatus for converting a picture into a video. The apparatus may be composed of hardware and/or software and generally be integrated in a device with the function of converting a picture into a video. The device may be a mobile terminal, a server, a server cluster, or other electronic devices. As shown in FIG. 1, the method includes the steps below.

In S110, an original picture is subjected to color fading processing to obtain a black-and-white image.

The black-and-white image may consist of a single black-and-white picture or may be formed by superimposing a black-and-white picture on a color picture.

In an embodiment, the black-and-white image includes a black-and-white picture layer and an original picture layer. The process of performing the color fading processing on the original picture to obtain the black-and-white image may be performing binarization processing on the original picture to obtain a black-and-white picture and superimposing the black-and-white picture to the original picture to obtain the black-and-white image. In this embodiment of the present disclosure, the black-and-white picture layer is located above the original picture layer.

In S120, a foreground area and a background area of the black-and-white image are determined.

The foreground area may be a target area to be recognized such as a portrait area, an animal area, and a building area. The background area is an area other than the foreground area. In this embodiment, the foreground area and the background area of the black-and-white image may be determined by pre-clipping a foreground segmentation area or a background segmentation area as a mask.

The manner in which the foreground area and the background area of the black-and-white image are determined may be sending the original picture to a server so that the server performs foreground clipping on the original picture to obtain a foreground segmentation area; receiving the foreground segmentation area returned by the server; and determining the foreground area and the background area of the black-and-white image according to the foreground segmentation area.

The manner in which the server performs the foreground clipping on the original picture may be first recognizing a foreground image in the original picture, and then clipping the area in which the foreground image is located to obtain the foreground segmentation area and the background segmentation area. In this embodiment of the present disclosure, the foreground image in the original picture may be recognized by using a recognition model. For example, if the foreground image is a portrait, a portrait recognition model is used for recognizing. If the foreground image is an animal, an animal recognition model is used for recognizing. The target type to be recognized is not limited in this embodiment.

In this embodiment of the present disclosure, the server may return the foreground segmentation area to the mobile terminal, or may return the background segmentation area to the mobile terminal for use as a mask to separate the foreground area and the background area in the black-and-white image.

In S130, iterative color restoration is performed on pixels in the black-and-white image based on a processing order of the foreground area and the background area, and an image obtained by each restoration is stored as a picture frame to obtain multiple frames of images.

The processing sequence includes processing the foreground area first and then processing the background area or processing the background area first and then processing the foreground area. Color restoration may be understood as restoring the color of the pixels in the black-and-white image to the color of the original picture. The manner of restoring the color of the pixels in the black-and-white image to the color of the original picture may be directly replacing the color values of the pixels in the black-and-white image with the color values of the pixels in the original picture. Alternatively, masking filtering is used for restoring the color of the black-and-white image.

In an embodiment, the manner in which the iterative color restoration is performed on the pixels in the black-and-white image may be performing the iterative color restoration on the pixels in the black-and-white image according to the progress of a set number or a set proportion.

The set proportion may be understood as the proportion of all pixels contained in the black-and-white image or the proportion of all pixels contained in the current area. Exemplarily, the iterative color restoration is performed at the progress of restoring 100 pixels each time. Alternatively, the iterative color restoration is performed at the progress of restoring 5% of the total pixels each time. Alternatively, when the foreground area is restored, iterative restoration is performed at the progress of restoring 10% of the total pixels in the foreground area each time; and when the background area is restored, the iterative restoration is performed at the progress of restoring 10% of the total pixels in the background area each time.

The process of performing the iterative color restoration on the pixels in the black-and-white image based on the processing order of the foreground area and the background area may be as follows. If the processing sequence is that the foreground area is processed first and then the background area is processed, iterative masking filtering is performed on pixels in the foreground area of the black-and-white picture layer according to a first direction, and the iterative masking filtering is performed on pixels in the background area of the black-and-white picture layer according to a second direction. If the processing sequence is that the background area is processed first and then the foreground area is processed, the iterative masking filtering is performed on pixels in the background area of the black-and-white picture layer according to a third direction, and the iterative masking filtering is performed on pixels in the foreground area of the black-and-white picture layer according to a fourth direction.

Each of the first direction, the second direction, the third direction, and the fourth direction may be one of from top to bottom, from bottom to top, from left to right, from right to left, from left upper corner to right lower corner, from right upper corner to left lower corner, from left lower corner to right upper corner, or from right lower corner to left upper corner. The second direction may be from top to bottom, from bottom to top, from left to right, from right to left, from left upper corner to right lower corner, from right upper corner to left lower corner, from left lower corner to right upper corner, or from right lower corner to left upper corner. The first direction and the second direction may be the same or different. The third direction and the fourth direction may be the same or different. In this embodiment, the pixels in the foreground area of the black-and-white picture layer may be randomly subjected to the iterative masking filtering, and the pixels in the background area of the black-and-white picture layer may be randomly subjected to the iterative masking filtering. This is not limited herein.

The process of masking processing may be understood as a process of erasing pixels in the black-and-white picture layer, thereby displaying the original picture layer located under the black-and-white picture layer.

The manner in which the iterative color restoration is performed on the pixels in the black-and-white image may be acquiring first color values of the pixels in the original picture and performing the iterative color restoration on the pixels in the black-and-white image according to the first color values.

In this embodiment, the black-and-white image consists of a single black-and-white picture. The color values of the pixels in the original picture may be read in advance and stored. When the iterative color restoration is performed, the color values of the pixels in the black-and-white image are replaced with the color values of the pixels in the original image.

If the processing sequence is that the foreground area is processed first and then the background area is processed, the color values of the pixels in the foreground area of the black-and-white image are iteratively replaced with the color values of the pixels in the foreground area of the original picture according to a preset direction and preset progress, and then, the color values of the pixels in the background area of the black-and-white image are iteratively replaced with the color values of the pixels in the background area of the original picture according to the preset direction and the preset progress.

If the processing sequence is that the background area is processed first and then the foreground area is processed, the color values of the pixels in the background area of the black-and-white image are iteratively replaced with the color values of the pixels in the background area of the original picture according to a preset direction and preset progress, and then, the color values of the pixels in the foreground area of the black-and-white image are iteratively replaced with the color values of the pixels in the foreground area of the original picture according to the preset direction and the preset progress.

In S140, the multiple frames of images are spliced to obtain a target video.

The manner in which the multiple frames of images are spliced may be splicing according to timestamps of the multiple frames of images. The target video is a foreground color retention album.

The manner in which the multiple frames of images are spliced to obtain the target video may be splicing the multiple frames of images by adding a set transition effect between adjacent images and rendering the multiple frames of spliced images to obtain the target video.

The set transition effect between adjacent images may be the same or different. The set transition effect may be a pre-set effect or an arbitrarily selected effect.

According to the technical schemes in this embodiment of the present disclosure, color fading processing is first performed on the original image to obtain the black-and-white image. Then, the foreground area and the background area of the black-and-white image are determined. Iterative color restoration is performed on the pixels in the black-and-white image based on the processing order of the foreground area and the background area. The image obtained by each restoration is stored as a picture frame to obtain the multiple frames of images. Finally, the multiple frames of images are spliced to obtain the target video. According to the method for converting a picture into a video provided in this embodiment of the present disclosure, the iterative color restoration is performed on the pixels in the black-and-white image. The image obtained by each restoration is stored as a picture frame to obtain the multiple frames of images. The multiple frames of images are spliced to obtain the target video. The method can convert a static picture into a dynamic video, thereby implementing the automatic production of a foreground area color retention album without manual production of a video, and improving the convenience of production of an album.

The method for converting a picture into a video provided in this embodiment of the present disclosure can be brought online as a function of a video application (APP). The function may implement automatic editing, creation, and sharing of a video. In this application scenario, a user selects the function of converting a picture into a video in the video APP and selects a picture to be converted into a video. A client uploads the picture to a server. The server acquires the picture uploaded by the client, generates a mask area of portrait segmentation of the picture according to an algorithm, and returns the generated result to the client. The client downloads the result, completes the implementation of the mask animation and renders the content of a shielding/display area, generates a video after adding a transition effect, and performs a preview of automatically playing the video. The user may share or publish the video. According to the schemes in the present application, the user does not need to make videos manually and only needs to upload pictures. This greatly reduces the cost of generating videos from pictures.

Figure 2:
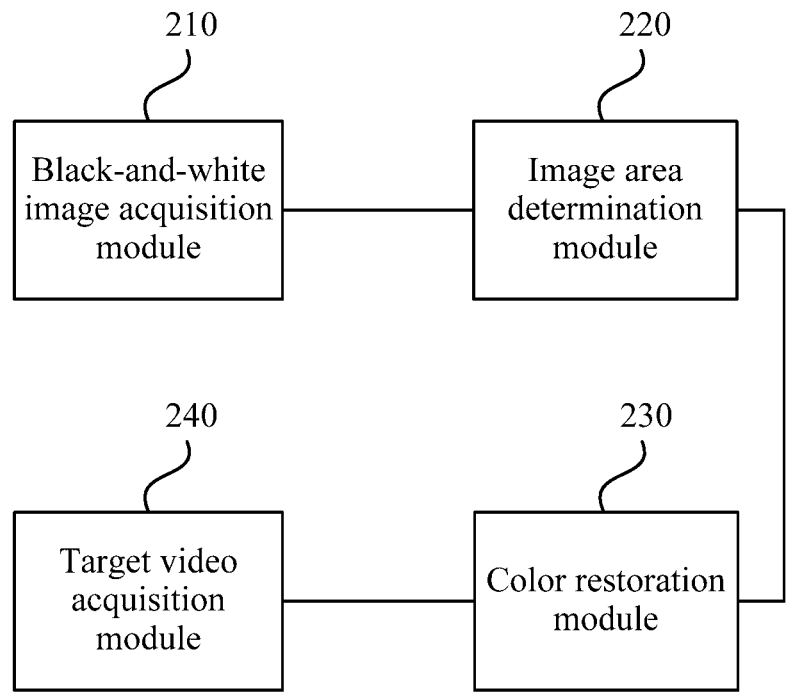
FIG. 2 is a diagram illustrating the structure of an apparatus for converting a picture into a video according to an embodiment of the present disclosure.

FIG. 2 is a diagram illustrating the structure of an apparatus for converting a picture into a video according to an embodiment of the present disclosure. As shown in FIG. 2, the apparatus includes a black-and-white image acquisition module 210, an image area determination module 220, a color restoration module 230, and a target video acquisition module 240.

The black-and-white image acquisition module 210 is configured to perform color fading processing on an original picture to obtain a black-and-white image. The image area determination module 220 is configured to determine a foreground area and a background area of the black-and-white image. The color restoration module 230 is configured to perform iterative color restoration on pixels in the black-and-white image based on a processing order of the foreground area and the background area and store an image obtained by each restoration as a picture frame to obtain multiple frames of images. The target video acquisition module 240 is configured to splice the multiple frames of images to obtain a target video.

In an embodiment, the black-and-white image may include a black-and-white picture layer and an original picture layer. The black-and-white image acquisition module 210 is configured to perform binarization processing on the original picture to obtain a black-and-white picture and superimpose the black-and-white picture to the original picture to obtain the black-and-white image.

In an embodiment, the image area determination module 220 is configured to send the original picture to a server so that the server performs foreground clipping on the original picture to obtain a foreground segmentation area, receive the foreground segmentation area returned by the server, and determine the foreground area and the background area of the black-and-white image according to the foreground segmentation area.

In an embodiment, the color restoration module 230 is configured to perform the iterative color restoration on the pixels in the black-and-white image based on the processing order of the foreground area and the background area in the following manner: if the processing sequence is that the foreground area is processed first and then the background area is processed, iterative masking filtering is performed on pixels in the foreground area of the black-and-white picture layer according to a first direction, and the iterative masking filtering is performed on pixels in the background area of the black-and-white picture layer according to a second direction.

In an embodiment, the color restoration module 230 is configured to perform the iterative color restoration on the pixels in the black-and-white image based on the processing order of the foreground area and the background area in the following manner: if the processing sequence is that the background area is processed first and then the foreground area is processed, iterative masking filtering is performed on pixels in the background area of the black-and-white picture layer according to a third direction, and iterative masking filtering is performed on pixels in the foreground area of the black-and-white picture layer according to a fourth direction.

In an embodiment, the color restoration module 230 is configured to perform the iterative color restoration on the pixels in the black-and-white image in the following manner: acquiring first color values of pixels in the original picture and performing the iterative color restoration on the pixels in the black-and-white image according to the first color values.

In an embodiment, the color restoration module 230 is configured to perform the iterative color restoration on the pixels in the black-and-white image according to the first color values in the following manner: iteratively replacing second color values of the pixels in the black-and-white image with the first color values.

In an embodiment, the color restoration module 230 is configured to perform the iterative color restoration on the pixels in the black-and-white image in the following manner: performing the iterative color restoration on the pixels in the black-and-white image according to the progress of a set number or a set proportion.

In an embodiment, the target video acquisition module 240 is configured to splice the multiple frames of images by adding a set transition effect between adjacent images and render the multiple frames of spliced images to obtain the target video.

In an embodiment, the foreground area includes a portrait area.

The preceding apparatus may execute the method provided in all preceding embodiments of the present disclosure and has functional modules and beneficial effects corresponding to the executed method. Technology details that are not described in detail in this embodiment can refer to the method provided in all preceding embodiments of the present disclosure.

Figure 3:
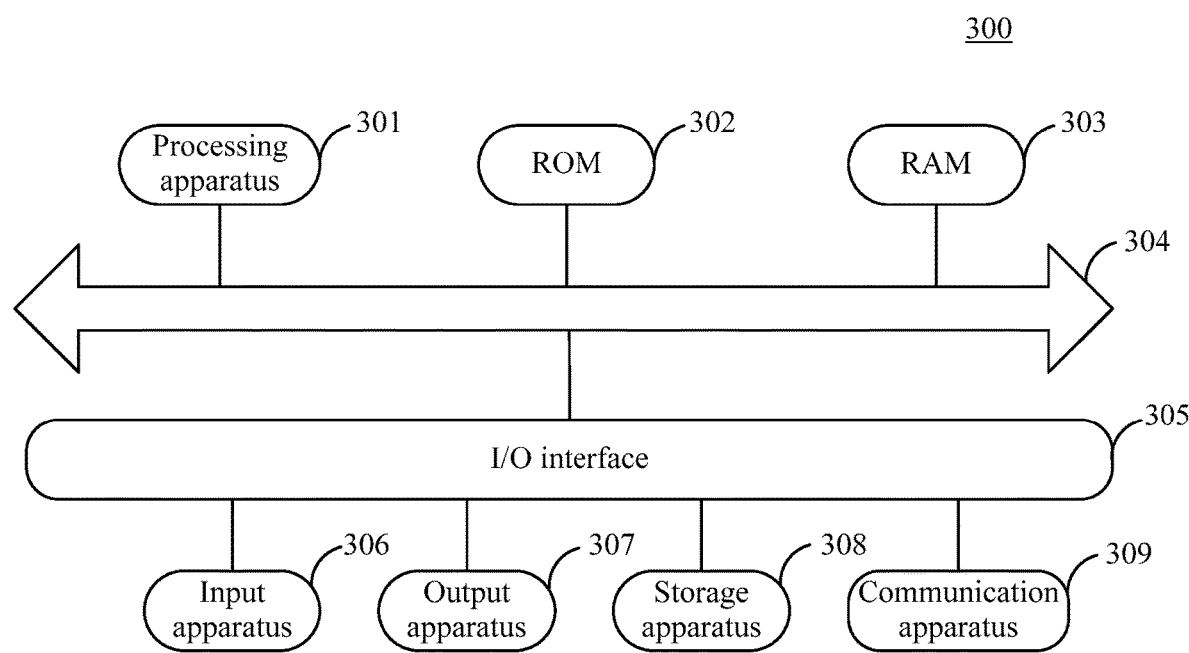
FIG. 3 is a diagram illustrating the structure of an electronic device according to an embodiment of the present disclosure.

Referring to FIG. 3, FIG. 3 shows a structure diagram of an electronic device 300 suitable for implementing the embodiments of the present disclosure. The terminal device in the embodiments of the present disclosure may include, but is not limited to, mobile terminals such as a mobile phone, a laptop, a digital broadcast receiver, a personal digital assistant (PDA), a portable Android device (PAD), a portable media player (PMP) and an in-vehicle terminal (such as an in-vehicle navigation terminal), and stationary terminals such as a digital television (TV) and a desktop computer. The electronic device shown in FIG. 3 is merely an example and is not intended to limit the function and usage scope of the embodiments of the present disclosure.

As shown in FIG. 3, the electronic device 300 may include a processing apparatus (such as a central processing unit and a graphics processing unit) 301. The processing apparatus 301 may execute multiple appropriate actions and processing according to a program stored in a read-only memory (ROM) 302 or a program loaded into a random-access memory (RAM) 303 from a storage apparatus 308. Various programs and data required for the operation of the electronic device 300 are also stored in the RAM 303. The processing apparatus 301, the ROM 302, and the RAM 303 are connected to each other through a bus 304. An input/output (I/O) interface 305 is also connected to the bus 304.

Generally, the following apparatus may be connected to the I/O interface 305: a touch screen, a touch pad, a keyboard, a mouse, a camera, a microphone, an accelerometer, a gyroscope and other input apparatuses 306; a liquid crystal display (LCD), a speaker, a vibrator and other output apparatuses 307; a magnetic tape, a hard disk and other storage apparatuses 308; and a communication apparatus 309. The communication apparatus 309 may allow the electronic device 300 to perform wireless or wired communication with other devices to exchange data. FIG. 3 shows the electronic device 300 having various apparatuses, but it is not necessary to implement or be equipped all the shown apparatuses. Alternatively, more or fewer apparatuses may be implemented or equipped.

According to the embodiments of the present disclosure, the process described above with reference to the flowchart may be implemented as a computer software program. For example, this embodiment of the present disclosure includes a computer program product. The computer program product includes a computer program carried in a computer-readable medium. The computer program includes program codes for executing the method described above. In such an embodiment, the computer program may be downloaded from a network and installed through the communication apparatus 309, or may be installed from the storage apparatus 308, or may be installed from the ROM 302. When the computer program is executed by the processing apparatus 301, the preceding functions limited in the method of the embodiments of the present disclosure are executed.

The preceding computer-readable medium in the present disclosure may be a computer-readable signal medium, a computer-readable storage medium or any combination thereof. The computer-readable storage medium, for example, may be, but is not limited to, an electronic, magnetic, optical, electromagnetic, infrared or semiconductor system, apparatus or device or any combination thereof. An example of the computer-readable storage medium may include, but is not limited to, an electrical connection having one or more wires, a portable computer magnetic disk, a hard disk, a RAM, a ROM, an erasable programmable read-only memory (EPROM or a flash memory), an optical fiber, a portable compact disc read-only memory (CD-ROM), an optical storage device, a magnetic storage device, or any suitable combination thereof. In the present disclosure, the computer-readable storage medium may be any tangible medium containing or storing a program. The program may be used by or used in conjunction with an instruction execution system, apparatus, or device. In the present disclosure, the computer-readable signal medium may include a data signal propagated on a baseband or as a part of a carrier, and computer-readable program codes are carried in the data signal. The data signal propagated in this manner may be in multiple forms and includes, but is not limited to, an electromagnetic signal, an optical signal, or any suitable combination thereof. The computer-readable signal medium may also be any computer-readable medium other than the computer-readable storage medium. The computer-readable signal medium may send, propagate, or transmit a program used by or in conjunction with an instruction execution system, apparatus, or device. The program codes contained in the computer-readable medium may be transmitted in any suitable medium, including, but not limited to, a wire, an optical cable, a radio frequency (RF), or any suitable combination thereof.

In some embodiments, clients and servers may communicate using any currently known or future developed network protocol, such as the Hypertext Transfer Protocol (HTTP), and may be interconnected with any form or medium of digital data communication (for example, a communication network). Examples of the communication network include a local area network (LAN), a wide area network (WAN), an internet (for example, the Internet), a peer-to-peer network (for example, an Ad-Hoc network), and any currently known or future developed network.

The computer-readable medium may be contained in the preceding electronic device or may exist alone without being assembled into the electronic device.

The computer-readable medium carries one or more programs. When the one or more programs are executed by the electronic device, the electronic device performs color fading processing on an original picture to obtain a black-and-white image, determines a foreground area and a background area of the black-and-white image, performs iterative color restoration on pixels in the black-and-white image based on a processing order of the foreground area and the background area, stores an image obtained by each restoration as a picture frame to obtain multiple frames of images, and splices the multiple frames of images to obtain a target video.

Computer program codes for executing the operations in the present disclosure may be written in one or more programming languages or combination thereof. The preceding one or more programming languages include, but are not limited to, object-oriented programming languages such as Java, Smalltalk, and C++, as well as conventional procedural programming languages such as C or similar programming languages. Program codes may be executed entirely on a user computer, partly on a user computer, as a stand-alone software package, partly on a user computer and partly on a remote computer, or entirely on a remote computer or a server. In the case involving the remote computer, the remote computer may be connected to the user computer through any type of network including a LAN or a WAN, or may be connected to an external computer (for example, via the Internet through an Internet service provider).

The flowcharts and block diagrams in the drawings show the possible architecture, function, and operation of the system, method, and computer program product according to various embodiments of the present disclosure. In this regard, each block in the flowcharts or block diagrams may represent a module, a program segment, or part of codes that contains one or more executable instructions for implementing specified logical functions. It is also to be noted that in some alternative implementations, the functions marked in the blocks may occur in an order different from those marked in the drawings. For example, two successive blocks may, in fact, be executed substantially in parallel or in a reverse order. This depends on the functions involved. It is also to be noted that each block in the block diagrams and/or flowcharts and a combination of blocks in the block diagrams and/or flowcharts may be implemented by a special-purpose hardware-based system executing specified functions or operations, or a combination of special-purpose hardware and computer instructions.

The units involved in the embodiments of the present disclosure may be implemented by software or hardware. The name of a unit is not intended to limit the unit in a certain circumstance.

The functions described above herein may be executed, at least partially, by one or more hardware logic components. For example, without limitations, exemplary types of hardware logic components that may be used include a field programmable gate array (FPGA), an application-specific integrated circuit (ASIC), an application specific standard product (ASSP), a system on a chip (SoC), and a complex programmable logic device (CPLD).

In the context of the present disclosure, the machine-readable medium may be a tangible medium that may include or store a program that is used by or used in conjunction with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any suitable combination thereof. Examples of the machine-readable storage medium may include an electrical connection based on one or more wires, a portable computer disk, a hard disk, a RAM, a ROM, an EPROM or a flash memory, an optical fiber, a CD-ROM, an optical storage device, a magnetic storage device, or any suitable combination thereof.

According to one or more embodiments of the present disclosure, the embodiments of the present disclosure disclose a method for converting a picture into a video. The method includes performing color fading processing on an original picture to obtain a black-and-white image; determining a foreground area and a background area of the black-and-white image; performing iterative color restoration on pixels in the black-and-white image based on a processing order of the foreground area and the background area, and storing the image obtained by each restoration as a picture frame to obtain multiple frames of images; and splicing the multiple frames of images to obtain a target video.

The black-and-white image includes a black-and-white picture layer and an original picture layer. Performing the color fading processing on the original picture to obtain the black-and-white image includes performing binarization processing on the original picture to obtain a black-and-white picture and superimposing the black-and-white picture to the original picture to obtain the black-and-white image.

Determining the foreground area and the background area of the black-and-white image includes sending the original picture to a server so that the server performs foreground clipping on the original picture to obtain a foreground segmentation area; receiving the foreground segmentation area returned by the server; and determining the foreground area and the background area of the black-and-white image according to the foreground segmentation area.

Performing the iterative color restoration on the pixels in the black-and-white image based on the processing order of the foreground area and the background area includes, if the processing sequence is that the foreground area is processed first and then the background area is processed, performing iterative masking filtering on pixels in the foreground area of the black-and-white picture layer according to a first direction, and performing the iterative masking filtering on pixels in the background area of the black-and-white picture layer according to a second direction.

Performing the iterative color restoration on the pixels in the black-and-white image based on the processing order of the foreground area and the background area includes, if the processing sequence is that the background area is processed first and then the foreground area is processed, performing iterative masking filtering on pixels in the background area of the black-and-white picture layer according to a third direction, and performing the iterative masking filtering on pixels in the foreground area of the black-and-white picture layer according to a fourth direction.

Performing the iterative color restoration on the pixels in the black-and-white image includes acquiring first color values of pixels in the original picture and performing iterative color restoration on the pixels in the black-and-white image according to the first color values.

Performing the iterative color restoration on the pixels in the black-and-white image according to the first color values includes replacing second color values of the pixels in the black-and-white image iteratively with the first color values.

Performing the iterative color restoration on the pixels in the black-and-white image includes performing iterative color restoration on the pixels in the black-and-white image according to the progress of a set number or a set proportion.

Splicing the multiple frames of images to obtain the target video includes splicing the multiple frames of images by adding a set transition effect between adjacent images and rendering the multiple frames of spliced images to obtain the target video.

The foreground area includes a portrait area.

What is claimed is:

1. A method for converting a picture into a video, comprising:
    performing color fading processing on an original picture to obtain a black-and-white image;
    determining a foreground area of the black-and-white image and a background area of the black-and-white image;
    performing, according to a color value of each pixel in the original picture, iterative color restoration on pixels in the black-and-white image based on a processing order of the foreground area and the background area, and storing an image obtained at each iteration of the color restoration as a picture frame to obtain a plurality of frames; and
    splicing the plurality of frames to obtain a target video.

2. The method according to claim 1, wherein the black-and-white image comprises a black-and-white picture layer and an original picture layer, and performing the color fading processing on the original picture to obtain the black-and-white image comprises:
    performing binarization processing on the original picture to obtain a black-and-white picture; and
    superimposing the black-and-white picture to the original picture to obtain the black-and-white image.

3. The method according to claim 2, wherein determining the foreground area of the black-and-white image and the background area of the black-and-white image comprises:
    sending the original picture to a server so that the server performs foreground clipping on the original picture to obtain a foreground segmentation area;
    receiving the foreground segmentation area returned by the server; and
    determining, according to the foreground segmentation area, the foreground area of the black-and-white image and the background area of the black-and-white image.

4. The method according to claim 3, wherein each iteration of the iterative color restoration comprises:
    in a case where the processing sequence is that the foreground area is processed first and then the background area is processed, performing iterative masking filtering on pixels in the foreground area of the black-and-white picture layer according to a first direction, and performing the iterative masking filtering on pixels in the background area of the black-and-white picture layer according to a second direction.

5. The method according to claim 4, wherein each iteration of the iterative color restoration is performed on a predetermined number of pixels or a predetermined proportion of pixels of the black-and-white image.

6. The method according to claim 3, wherein each iteration of the iterative color restoration comprises:
    in a case where the processing sequence is that the background area is processed first and then the foreground area is processed, performing iterative masking filtering on pixels in the background area of the black-and-white picture layer according to a third direction, and performing the iterative masking filtering on pixels in the foreground area of the black-and-white picture layer according to a fourth direction.

7. The method according to claim 1, wherein each iteration of the iterative color restoration comprises:
    acquiring the color value of each pixel in the original picture; and
    performing color restoration on the pixels in the black-and-white image according to the color value of each pixel in the original picture.

8. The method according to claim 7, wherein performing the color restoration on the pixels in the black-and-white image comprises:
    replacing the color value of each pixel in the black-and-white image iteratively with the acquired color value of the pixel in the original picture corresponding to said each pixel.

9. The method according to claim 1, wherein splicing the plurality of frames to obtain the target video comprises:
    adding a set transition effect between adjacent frames of the plurality of frames; and
    rendering the plurality of frames and the added set transition effect to obtain the target video.

10. The method according to claim 1, wherein the foreground area comprises a portrait area.

11. An electronic device, comprising:
    at least one processing apparatus; and
    a storage apparatus configured to store at least one instruction;
    wherein when the at least one instruction is executed by the at least one processing apparatus, the at least one processing apparatus implements the following:
    performing color fading processing on an original picture to obtain a black-and-white image;
    determining a foreground area of the black-and-white image and a background area of the black-and-white image;
    performing, according to a color value of each pixel in the original picture, iterative color restoration on pixels in the black-and-white image based on a processing order of the foreground area and the background area, and storing an image obtained at each iteration of the color restoration as a picture frame to obtain a plurality of frames; and splicing the plurality of frames to obtain a target video.

12. The electronic device according to claim 11, wherein the black-and-white image comprises a black-and-white picture layer and an original picture layer, and the at least one processing apparatus implements performing the color fading processing on the original picture to obtain the black-and-white image by:

performing binarization processing on the original picture to obtain a black-and-white picture; and superimposing the black-and-white picture to the original picture to obtain the black-and-white image.

13. The electronic device according to claim 12, wherein the at least one processing apparatus implements determining the foreground area of the black-and-white image and the background area of the black-and-white image by:

sending the original picture to a server so that the server performs foreground clipping on the original picture to obtain a foreground segmentation area;

receiving the foreground segmentation area returned by the server; and determining, according to the foreground segmentation area, the foreground area of the black-and-white image and the background area of the black-and-white image.

14. The electronic device according to claim 13, wherein the at least one processing apparatus implements each iteration of the iterative color restoration by:

in a case where the processing sequence is that the foreground area is processed first and then the background area is processed, performing iterative masking filtering on pixels in the foreground area of the black-and-white picture layer according to a first direction, and performing the iterative masking filtering on pixels in the background area of the black-and-white picture layer according to a second direction.

15. The electronic device according to claim 14, wherein the at least one processing apparatus implements each iteration of the iterative color restoration on a predetermined number of pixels or a predetermined proportion of pixels of the black-and-white image.

16. The electronic device according to claim 13, wherein the at least one processing apparatus implements each iteration of the iterative color restoration by:

in a case where the processing sequence is that the background area is processed first and then the foreground area is processed, performing iterative masking filtering on pixels in the background area of the black-and-white picture layer according to a third direction, and performing the iterative masking filtering on pixels in the foreground area of the black-and-white picture layer according to a fourth direction.

17. The electronic device according to claim 11, wherein the at least one processing apparatus implements each iteration of the iterative color restoration by:

acquiring the color value of each pixel in the original picture; and performing color restoration on the pixels in the black-and-white image according to the color value of each pixel in the original picture.

18. The electronic device according to claim 17, wherein the at least one processing apparatus implements performing the color restoration on the pixels in the black-and-white image by:

replacing the color value of each pixel in the black-and-white image iteratively with the acquired color value of the pixel in the original picture corresponding to said each pixel.

19. The electronic device according to claim 11, wherein the at least one processing apparatus implements splicing the plurality of frames to obtain the target video by:

adding a set transition effect between adjacent frames of the plurality of frames; and rendering the plurality of frames and the added set transition effect to obtain the target video.

20. A non-transitory computer-readable storage medium storing computer programs, wherein when executed by a processing apparatus, the computer programs implement the following:

performing color fading processing on an original picture to obtain a black-and-white image;

determining a foreground area of the black-and-white image and a background area of the black-and-white image;

performing, according to a color value of each pixel in the original picture, iterative color restoration on pixels in the black-and-white image based on a processing order of the foreground area and the background area, and storing an image obtained at each iteration of the color restoration as a picture frame to obtain a plurality of frames; and splicing the plurality of frames to obtain a target video.

* * * * *